United States Patent
Durre et al.

(10) Patent No.: US 6,345,721 B1
(45) Date of Patent: Feb. 12, 2002

(54) FILTER ELEMENT INCLUDING A BAFFLE PLATE AND END CAP ADHESIVELY BONDED THERETO

(75) Inventors: Reynold Frederick Durre, Stevens Point, WI (US); John Francis Connelly, Chanhassen, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/507,126

(22) Filed: Feb. 18, 2000

(51) Int. Cl.[7] .............................................. B01D 27/08
(52) U.S. Cl. ..................... 210/440; 210/454; 210/493.2
(58) Field of Search .................................. 210/440, 455, 210/457, 459–461, 493.1, 493.2, 497.01, DIG. 17, 454

(56) References Cited

U.S. PATENT DOCUMENTS

| 2,888,141 | A |   | 5/1959 | Coates et al. |
| 3,036,711 | A |   | 5/1962 | Wilhelm |
| 3,061,101 | A |   | 10/1962 | Humbert, Jr. |
| 3,616,933 | A | * | 11/1971 | Baldwin .............. 210/DIG. 17 |
| 5,013,434 | A |   | 5/1991 | Furrow |
| 5,024,870 | A | * | 6/1991 | Jackson ................... 210/493.2 |
| 5,114,575 | A |   | 5/1992 | Yano et al. |

FOREIGN PATENT DOCUMENTS

| CA | 583608 | * | 9/1959 | .............. 210/493.1 |

* cited by examiner

Primary Examiner—Matthew O. Savage
(74) Attorney, Agent, or Firm—Merchant & Gould P.C.

(57) ABSTRACT

A filter assembly including a filter element having an extension of filter material potted in an end cap, the potting adhesive material potting the filtering material into the end cap and further adhering the end cap to a hub of a baffle plate. The end cap is an open end cap having an outer perimeter and an inner perimeter defined by a portion of the hub.

14 Claims, 4 Drawing Sheets

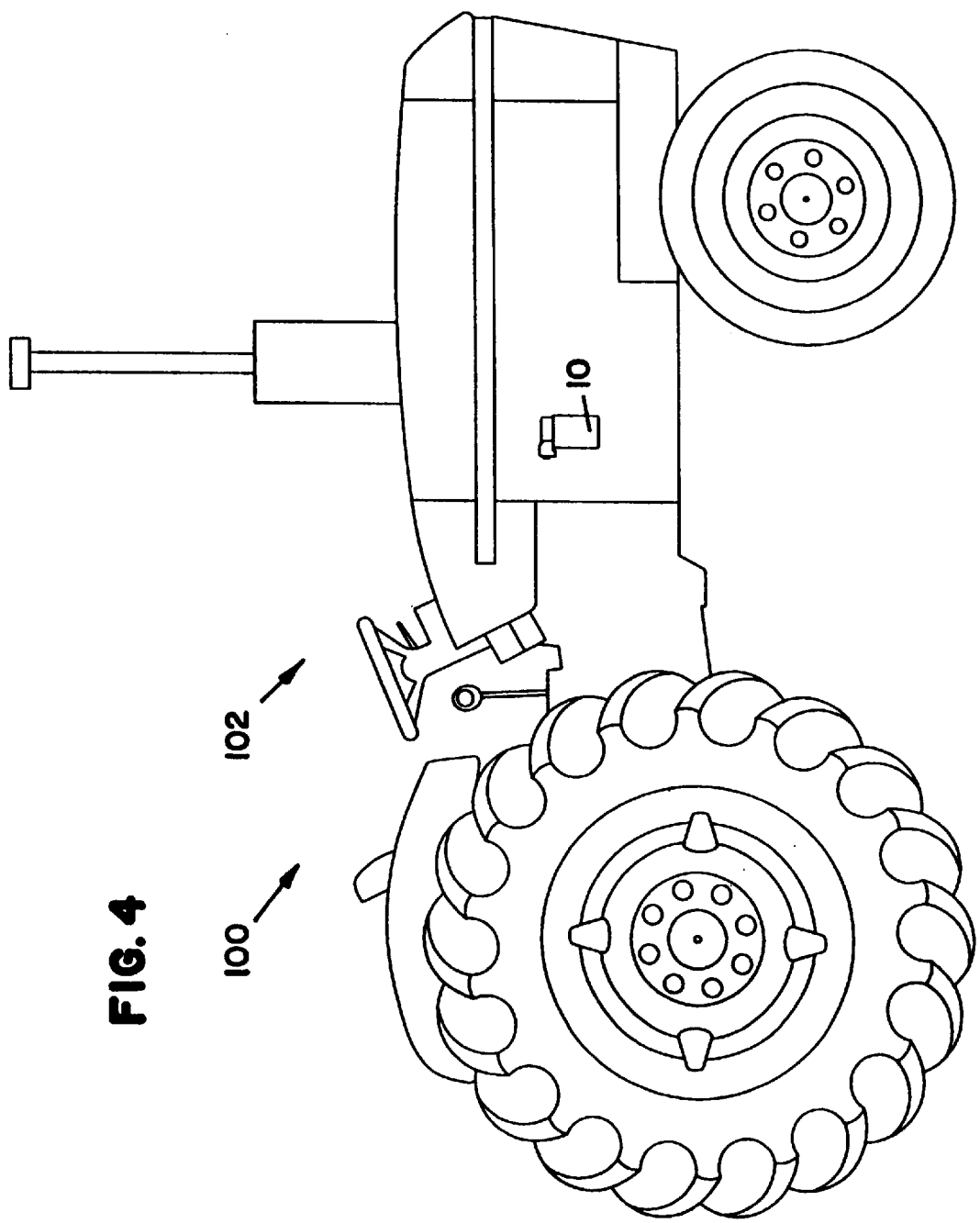

FILTER ELEMENT INCLUDING A BAFFLE PLATE AND END CAP ADHESIVELY BONDED THERETO

FIELD OF THE INVENTION

This disclosure concerns generally a fluid filter. In particular, this disclosure relates to a filter incorporating an end cap with a unitary cover, with an extension of filter media potted in the end cap.

BACKGROUND

Filters have been employed in a variety of applications including hydraulic systems and engine lubrication systems. Such filter assemblies generally include a cylindrical filter element within a can or housing with a baffle or attachment plate at one end to connect the filter to a filter head, typically by a threaded joint. A central opening and several surrounding openings in the baffle direct flow through the filter and, in particular, the filter element; the flow can be in either an inside/out or outside/in pattern. A circular gasket on the outside of the baffle serves as an external seal between the filter and filter head, while another circular gasket on the inside of the cover functions as the internal seal between the filter element and baffle.

Various models and variations of filters have been known over the years. Each design improves on an aspect of these filters. Continued improvements in filters are desired.

SUMMARY

An improved filter assembly is provided. In particular, the filter assembly includes a element having a first open end cap with a closed outer perimeter, an open inner perimeter, and a transverse wall extending therebetween. The filter element further has a baffle plate disposed at the first open end cap. The baffle plate includes a hub to receive the transverse wall at the open inner perimeter of the first open end cap; the hub can have a circumferential shoulder to receive the transverse wall. An adhesive material disposed within the first open end cap adheres the first open end cap to the hub.

In a preferred arrangement, a second closed end cap can be further provided, such that an extension of filtering material extends between, and is potted in, the two end caps by an adhesive material. The filter assembly can include a housing in which the filter element is disposed.

A system including the filter element and filter assembly is also provided.

Also provided is a method of the making a filter assembly having a filter element by: providing a first open end cap having an outer wall defining an outer perimeter, and a transverse wall; providing a generally cylindrical extension of filtering material; providing a baffle plate including a central hub adapted to extend into the extension of filtering material, the hub having a circumferential shoulder thereon for mounting the first end cap thereon; mounting the first end cap onto the circumferential shoulder; and potting the filtering material into the first open end cap with an adhesive material, the adhesive material adhering the filtering material within the end cap and the end cap to the hub, thus providing a filter element. The filter element is positioned in a housing, and the adhesive material is cured.

The filter element and the filter assembly can be utilized in a system for filtering contaminated fluid. The system includes a filter assembly having a housing and a filter element disposed within the housing, a filter head to which the filter assembly is attached, and appropriate inlet and outlet ports to provide dirty fluid to the filter assembly and remove clean fluid from the filter assembly. The filter assembly is included in a vehicle, such as a tractor.

BRIEF DESCRIPTION OF DRAWINGS

A better understanding of aspects of the disclosure can be had by reference to the following Detailed Description in conjunction with the accompanying Drawings, wherein:

FIG. 4 is a side view of a system incorporating the filter assembly of FIGS. 1 through 3.

DETAILED DESCRIPTION

Figure 1:
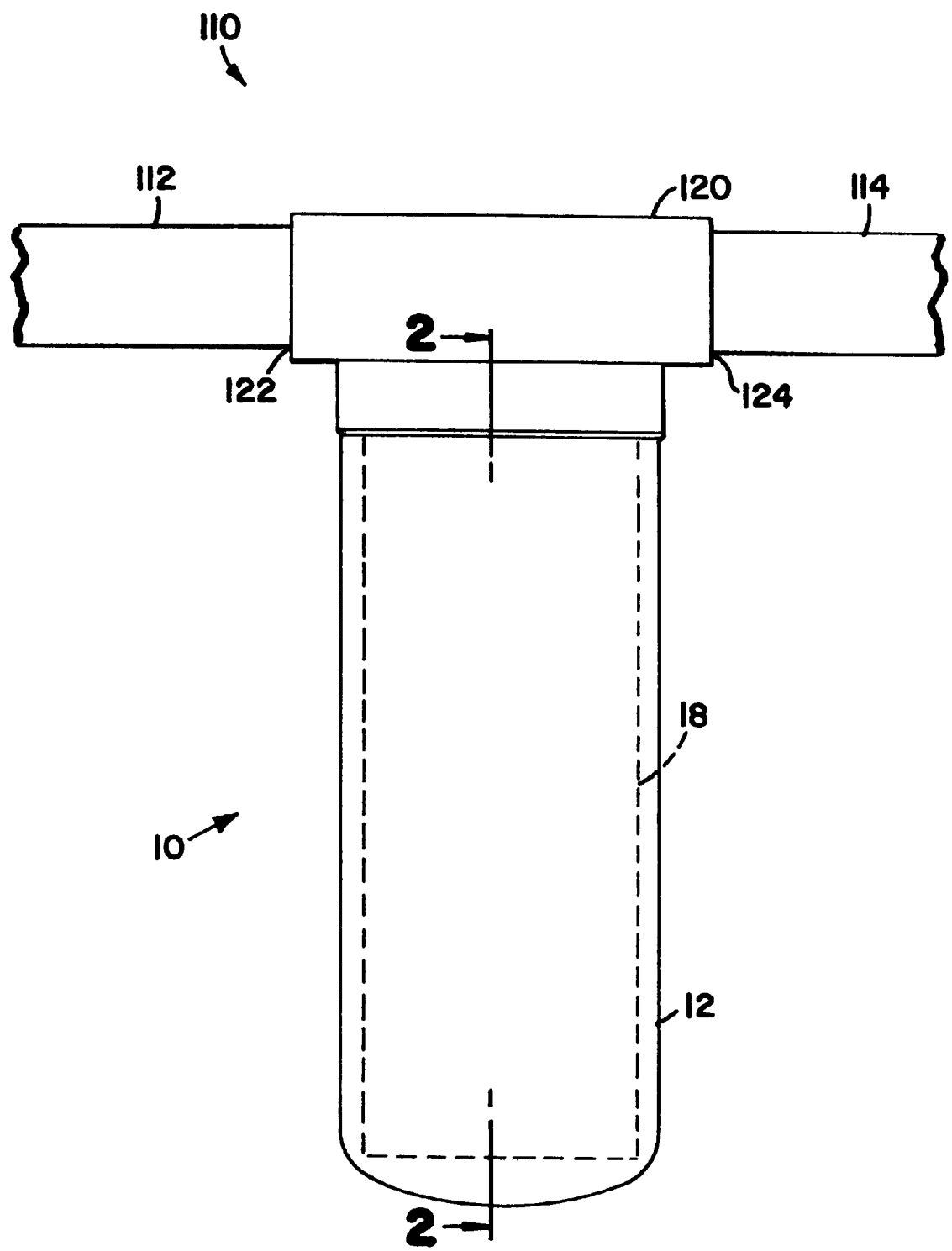
FIG. 1 is a schematic view of a filter assembly secured to a filter head.

Referring now to the Drawings, wherein like reference numerals denote corresponding elements throughout the views, and particularly referring to FIG. 1, there is shown a fluid filter assembly 10. Filter assembly 10 is particularly adapted for filtration of oil, as for example in a hydrostatic transmission or other hydraulic system.

The filter assembly 10, which includes an assembled filter element 18 in can or housing 12, is placed in a filtering system 110 such as shown in FIG. 1. Filter assembly 10 is attached to filter block or head 120, typically by screwing filter assembly 10 onto filter head 120 by internal threads on housing 12. Filtering system 110 includes a supply 112 for supplying dirty fluid to filter assembly 10 through inlet 122 of filter head 120. The fluid enters and is filtered by the filter element 18 (shown in phantom in FIG. 1). The clean fluid exits filter head 120 at outlet 124 and is carried away by pipe 114.

Referring to FIG. 4, one application for the filter assembly 10 is to remove foreign matter from hydraulic fluid that is used in vehicles 100. In FIG. 4, the particular vehicle 100 depicted is a tractor 102. An example of such a tractor is an agricultural tractor that has a hydrostatic transmission and a hydraulic system, both of which require a filter. Such tractors are available, for example, from Deere & Company, Caterpillar, and Case IH. The hydraulic system can be used for a variety of purposes including raising and lowering farm implements such as plows. A hydraulic system can also be used to raise and lower earth moving equipment such as blades, buckets, back hoes, and scrapers. An example of the type of hydraulic fluid for which the filter assembly 10 is used is "Hyguard". Additionally, the filter assembly 10 can be used with tractors that have a variety of engine sizes and pump sizes.

There are many other applications for the filter assembly 10 described herein. For example, the filter assembly 10 can be used for other farm equipment, construction equipment, skidders, loaders, other off-road vehicles, heavy-duty highway trucks, automobiles, and other vehicles, industrial machines requiring hydraulic filtering, and all other equipment or mechanical devices that require the filtering of fluids. Additionally, the filter assembly 10 can be used to remove foreign matter from a variety of different fluids. Examples of liquid fluids include other hydraulic fluids, engine lubrication oil, diesel fuel, gasoline, engine coolant, automatic transmission fluid, and any other type of fluid. The filter assembly 10 can also be used with gaseous fluids such as air and exhaust.

Figure 2:
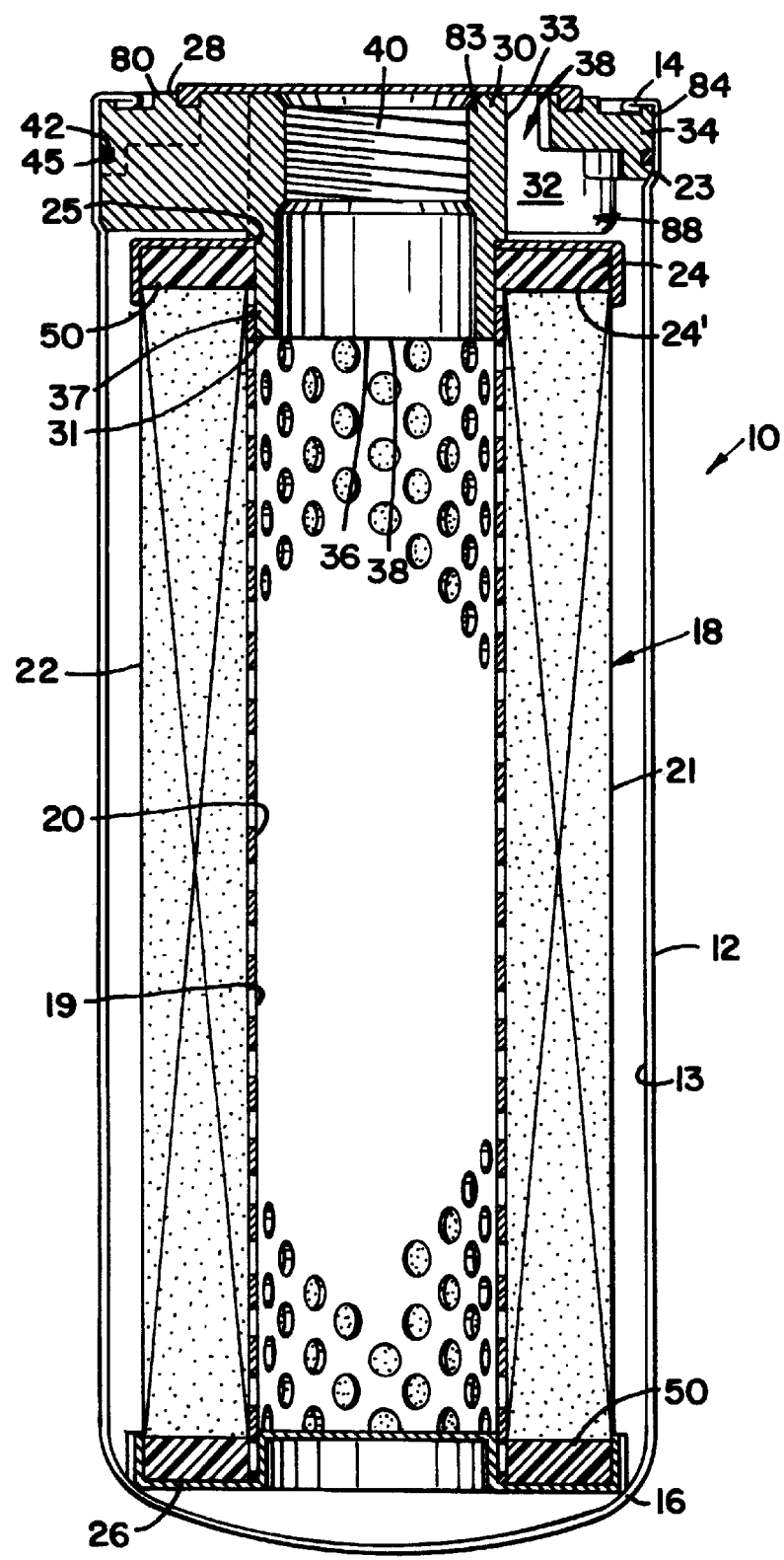
FIG. 2 is a cross-sectional view of the filter assembly taken along line 2—2 of FIG. 1, the filter assembly including a filter element in a housing.
Figure 3:
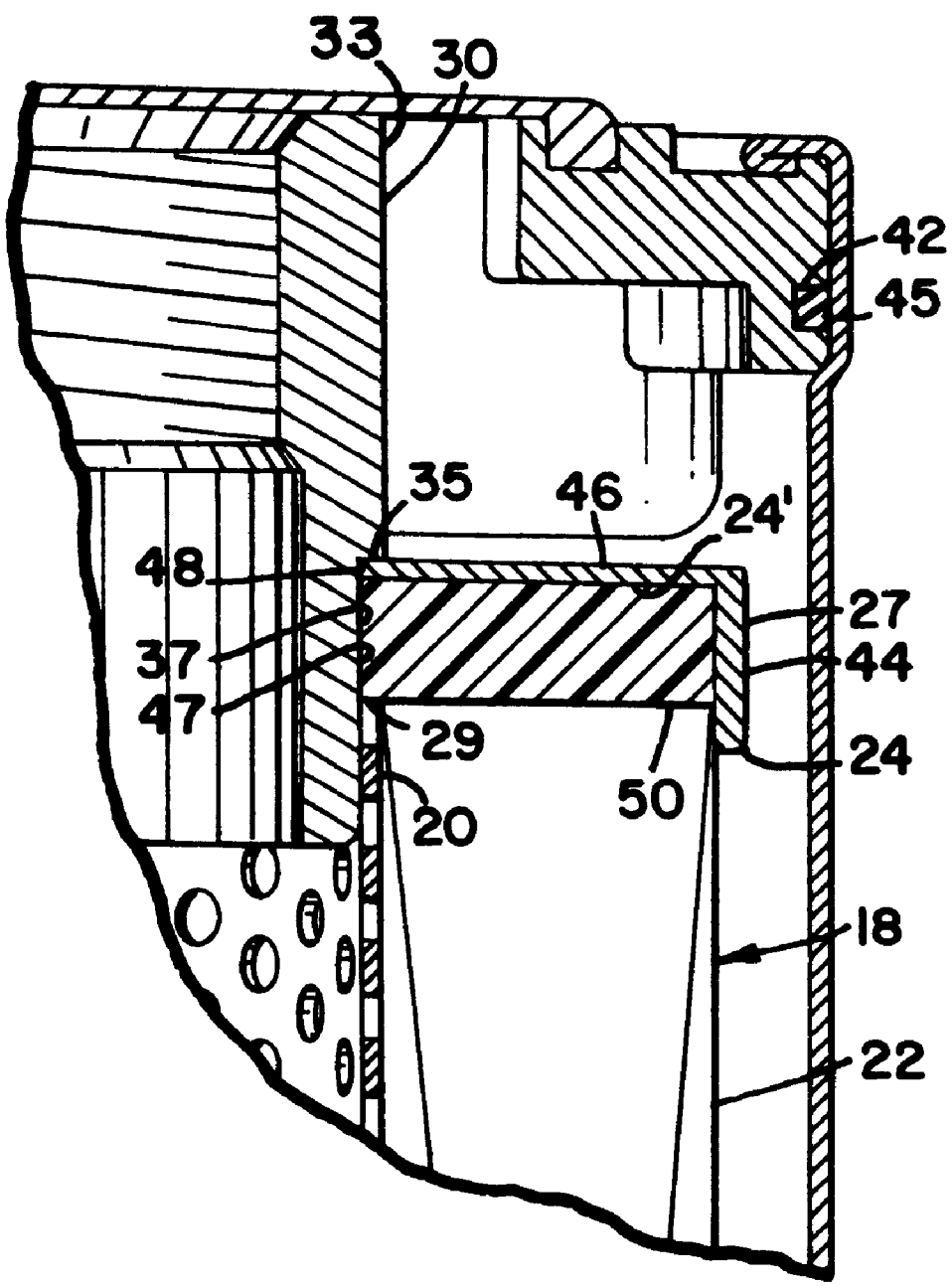
FIG. 3 is an enlarged detail of a portion of the cross-section view of FIG. 2.

Filter assembly 10 includes a filter element 18, shown in detail in FIGS. 2 and 3. Typically, filter element 18 is disposed within housing 12. Filter housing 12 has a filter chamber 13 designed to accept filter element 18 therein; filter housing 12 generally has an open first end 14 and a closed second end 16. Preferably, housing 12 is of generally thin-walled construction having sufficient integrity to withstand the pressure experienced during typical filtering operations. Housing 12 is typically metal, plastic, or other suitable metal; if housing 12 is metal, it is typically formed by stamping or drawing from the metal. In preferred applications, housing 12 is generally at least about 15.2 cm (6 inches) long; generally housing 12 is no greater than 61 cm (24 inches) long. Preferably, the length of housing 12 is about 20.3 cm (8 inches) to 30.5 cm (12 inches), with a diameter of no less than about 7.6 cm (3 inches) and no greater than about 30.5 cm (12 inches), preferably about 10.2 cm (4 inches) to 12.7 cm (5 inches). In one example, housing 12 can be about 24.1 cm (9.5 inches) long, 11.7 cm (4.6 inches) in diameter, and about 22 gauge or 0.76 mm (0.03 inches) in wall thickness.

The filter element 18 is located inside the filter chamber 13 defined by housing 12. Filter element 18 includes a filtering material 21 for removing contaminants, such as particulate, from the fluid being filtered. Filtering material 21 extends from, and is potted in, first end cap 24 and second end cap 26, as will be described below. Filtering material 21 defines an interior volume 19. Often, filtering material 21 is a filtering material such as paper, non-woven material, synthetic material, and the like. A screen or scrim material can also be used as filtering material 21. A preferred filtering material has co-mingled glass and polyester fibers and includes a metal scrim on one side of the material. Filtering material 21 may be treated or coated to improve its filtering capabilities.

In the particular embodiment shown in FIGS. 2 and 3, filtering material 21 includes filter media 22; filter media 22 is generally a pleated, porous material, such as paper. A perforated tubular inner liner 20 can be included in filter element 18. Inner liner 20 is surrounded by an extension of filter media 22, both of which are supported between end caps 24 and 26.

The first end cap 24 is an "open end cap"; that is, open end cap 24 includes a opening 25 therein; in the preferred one illustrated, opening 25 is centrally located. Opening 25 receives, circumscribes, and surrounds a portion of a baffle plate 80 secured across the open end 14 of housing 12. Additional features of first end cap 24 and of baffle plate 80 will be described below. The second end cap 26 is a "closed end cap" that extends across and covers the end of filtering material 21; no access can be gained to the inside of filter element 18 through second end cap 26. The filtering material 21 extends longitudinally between, and is potted in, the end caps 24 and 26.

Baffle plate 80, disposed adjacent to filter head (120 in FIG. 1), conveys filtered liquid from the filter and provides a barrier that prevents the bypass of unfiltered liquid around the filtering material 21. Baffle plate 80 has a sealing edge 84 that provides a mechanical interlock between baffle plate 80 and housing 12; no fluid from filter head 120 can pass outside of the filter past sealing edge 84; in a preferred embodiment, a seal is formed at sealing edge 84 by an o-ring, such as o-ring 45. A fluid passage 88 allows passage of fluid from filter head 120 to filter chamber 13 of housing 12. Baffle plate 80 includes hub 83 having a fluid duct that provides fluid communication from filter head 120 to the interior volume 19. When baffle plate 80 is installed with a filter element 18 in a housing 12, and with a filter head 120, preferably the only fluid communication between fluid duct 86 and fluid passage 88 is through filtering material 21.

If the filter assembly 10 is a "reverse flow" filter, with fluid flowing from interior volume 19 of filter element 18 through filtering material 21: dirty, unfiltered fluid enters interior volume 19 by passing through fluid duct of hub 83; the fluid passes through filtering material 21 which removes contaminants, and the filtered fluid, now in filter chamber 13, flows through fluid passage 88. If the filter assembly 10 is a "forward flow" filter, with fluid flowing from filter chamber 13 through filtering material 21: dirty, unfiltered fluid enters filter chamber 13 through fluid passage 88 in baffle plate 80 and passes through filtering material 21 which removes contaminants; the filtered fluid, now in interior volume 19, flows through fluid duct.

Baffle plate 80 can be formed of any suitable material, such as aluminum, iron, or other metal. In some chemical filtration applications, for example, it may be desirable to form baffle plate 80 by molding from plastic or other synthetic material. The baffle plate 80 is preferably formed, such as by casting, into a rigid integral unit. In some embodiments, hub 83 is integral with baffle plate 80; that is, the two elements are one structural piece.

In the embodiment of FIGS. 2 and 3, baffle plate 80 is depicted as baffle plate 28 positioned at the first end 14 of the filter element 18. The baffle plate 28 includes a hub 83, in particular, central axially extending hub 30, that is interconnected by a plurality of radial webs or ribs 32 with a generally circular outer rim 34. Hub 30 defines a fluid duct, in particular, central opening 36, extending through baffle plate 28 and terminating inside the filter element 18, in particular, inside inner liner 20. Fluid passages 88, defined by ribs 32 and surrounding hub 30, depicted as openings 38, extend from hub 30 to the outer edge 23 of baffle plate 28. Openings 36 and 38 thus serve as the fluid passages 88 by which fluid is conducted through filter element 18 in either an inside/out (i.e., "reverse flow") or outside/in (i.e., "forward flow") flow pattern relative to the filtering material 21.

Threads 40 are provided on the upper internal surface of the hub 30 for connecting filter assembly 10 to filter head (120 in FIG. 1). The hub 30 of baffle plate 28 preferably extends below ribs 32 and into the upper end of the filter element 18.

Various seals can be provided on the baffle plate 28 of filter assembly 10. A gasket or O-ring 45 is provided in a circumferential groove 42 formed around rim 34 for sealing purposes between baffle plate 28 and the upper end 14 of housing 12.

For additional details regarding the general structure of ribs 32, openings 36, 38, seals and O-rings and other features of baffle plate 28, see U.S. Pat. No. 4,369,133 (Stiffen), the disclosure of which is incorporated herein by reference.

As discussed above, filtering material 21 extends longitudinally between end caps 24, 26 and is potted in an adhesive material 50 held within end caps 24 and 26. Inner liner 20 also extends longitudinally between and is potted in end caps 24, 26. End caps may be any suitable material, such as a plastic material or metal, such as aluminum, steel, or the like. A fibrous material, such as paper, can also be used for end caps 24, 26. In a preferred example, first end cap 24 and second end cap 26 are tin plated steel.

Referring to the details of FIG. 3, first end cap 24 is constructed to accept adhesive material 50 and pot filtering material 21 therein. First end cap 24 includes a containment section 24' which accepts adhesive material 50 and filtering material 21. The adhesive material 50 within containment section 24' adheres end cap 24 to baffle plate 28, for example, to hub 30. Additionally, adhesive material 50 secures filtering material 21 within end cap 24.

In the embodiment shown in FIGS. 2 and 3, first end cap 24 has a two-sided containment section 24'having an outer first wall 44 and a transverse second wall 46. By "transverse" it is meant that it is disposed at least approximately perpendicular to filter element 18, and in particular, to the extension of filtering material 21. First end cap 24 has an outer perimeter 27 defined by outer first wall 44, and an inner perimeter 29 defined by the inner most portion 48 of transverse second wall 46. The inner most portion 48 of second wall 46 can abut hub 30 at an engagement surface 37. Alternately or additionally, inner most portion 48 can abut hub 30 at a shoulder 35, which is disposed on the periphery of hub 30.

In one example, the outer perimeter 27 has a diameter of about 3 to 4 inches, preferably about 3.4 inches, and the inner perimeter 29 has a diameter of about 1.25 to 1.75 inches, preferably about 1.5 to 1.6 inches. The length of transverse second wall 46 is about 0.5 inch to 1.5 inches, preferably about 1 inch.

In the particular embodiment depicted, engagement surface 37 of hub 30 begins at shoulder 35 and extends to an end 31 of hub 30 that is disposed in the interior volume 19 of filter element 18. Shoulder 35 is a point of transition between engagement surface 37 and the rest of hub 30; shoulder 35 is positioned where the diameter of hub 30 decreases to the diameter of engagement surface 37. The diameter of engagement surface 37 is typically at least about 0.5 mm less than the diameter of hub 30 between shoulder 35 and upper portion 33 of hub 30. Preferably, the diameter of engagement surface 37 is at least 0.75 mm less than the diameter of upper portion 33, more preferably at least 1 mm.

Shoulder 35 provides an abutment, or a "park place", against which first end cap 24 seats. Shoulder 35 is positioned at least 10% of the total length of hub 30 from inner end 31 of hub 30. Further, shoulder 35 is positioned no greater than about 75% of the length of hub 30 from inner end 31. In the embodiment depicted, shoulder 35 is positioned approximately 35% of the length of hub 30 from inner end 31. In some embodiments, shoulder 35 is positioned adjacent ribs 32 of baffle plate 28; shoulder 35 can be flush with ribs 32 or spaced therefrom.

It is understood that in some embodiments, first end cap 24 can be designed to seat against engagement surface 37 without abutting on shoulder 35; shoulder 35 may not even be present. In further embodiments, shoulder 35 may be as minimal as a molding line on hub 30.

In the embodiments where second wall 46 of first end cap 24 is positioned against shoulder 35, a seal is formed between end cap 24 and hub 30; end cap 24 preferably cannot move farther toward first end 14 than shoulder 35. Engagement surface 37 of hub 30 forms a third side 47, so that with outer first wall 44 and transverse second wall 46, first end cap 24 retains potting adhesive material 50 therein. Potting adhesive 50 permanently adheres itself to each of outer first wall 44, transverse second wall 46, and engagement surface 37 of hub 30 at third side 47. By "permanently adheres", it is meant that the bond between potting adhesive 50 and engagement surface 37 is sufficient to withstand forces typically encountered during filtering processes without breaking the bond; that is, the first end cap 24 cannot be removed from engagement surface 37 by typical forces and pressures generated during filtering processes.

Filtering material 21, such as media 22 and inner liner 20, is adhered within end cap 24 between first wall 44 and third wall 47 by potting adhesive material 50. Potting adhesive material 50 may be any adhesive material capable of securing the extension of filtering material 21, such as filter media 22 and inner liner 20, permanently to end cap 24, and end cap 24 to outer lower portion 37 of hub 30. Adhesive material 50 is preferably an organic material, but can be metal, such as solder. Organic adhesive materials are typically either thermoplastic or thermoset materials. A thermoplastic material is one that softens when exposed to heat and returns to its original condition when cooled to room temperature. Many hot melt adhesives are thermoplastic materials or include a thermoplastic material. A thermoset material is one that solidifies and sets irreversibly when heated or otherwise cured; this property is usually associated with a cross-linking reaction of the molecular constituents. A mixture of thermoset and thermoplastic adhesive materials can be used. Examples of usable adhesive materials include urethanes, phenolics, epoxies, acrylates, polyethylenes, polyvinyl acetates, polyamides, and the like.

In some embodiments, a primer coating may be applied to the containment section 24', to hub 30, or to both to increase the adhesion of adhesive material 50 to those parts.

First end cap 24 provides for cost savings over other end caps used for spin-on filters. For example, in conventional filter elements 18, the top end cap is typically a three-walled structure that can be removed from hub 30 of baffle plate 28. The end cap 24 of the present invention eliminates the third, inner, wall, thus providing a reduction in material costs for end cap 24.

Further, a rubber gasket or grommet is generally used to hold a conventional top end cap into place on hub 30 by friction. The design of the present invention eliminates the need for a gasket or grommet to hold the end cap 24 onto hub 30. The gasket or grommet also provides a leak-proof seal against hub 30. Without the grommet, end cap 24, in particular transverse second wall 46, seats against engagement surface 37 of hub 30, and, with potting adhesive 50, provides a tight, and permanent, seal.

Use of end cap 24 also decreases the cost associated with inner liner 20. Because end cap 24 does not have a third wall positioned against hub 30, inner liner 20 can be made with a smaller diameter than if a third wall was present on the end cap, as with conventional end caps. An example of a decrease in inner liner diameter is from about 1.92 inches to 1.77 inches. A small diameter inner liner 20 requires less material to make than a liner with a slightly larger diameter.

Because of the smaller diameter of inner liner 20, the pleats of filter media 22 can be folded to a larger pleat depth, thus approaching an optimum relationship between pleat depth and filter diameter. In one embodiment, the filter media 18 is folded to provide a fewer number of pleats with a larger pleat depth. An example of an increase of pleat depth is from about 0.68 inch to about 0.76 inch.

Additionally, elimination of the gasket or grommet also eliminates the processing step needed to attach a conventional end cap and the gasket or grommet to the hub. Further, this reduces the labor needed to assembly the filter element.

Method of Assembly

The filter element 18 can be made by providing the extension of filtering material 21, such as filter media 22 and inner liner 20, and potting the two ends of the filtering material 21 in first and second end caps 24, 26. Preferably, first end cap 24 is positioned against engagement surface 37 or shoulder 35 of hub 30 prior to placing filtering material 21 into end cap 24. Hub 30 is preferably integral with baffle plate 28; that is, hub 30 and baffle plate 28 are one piece. Potting adhesive material 50 is placed into the containment section 24' of end cap 24 and into second end cap 26, and the filtering material 21 is positioned therein. Potting adhesive 50 contacts and bonds to containment section 24', filtering material 21, and engagement surface 37 of hub 30. In some embodiments, it may be desired to have filtering material 21 within the end caps 24, 26 before placing potting adhesive material 50 therein.

It is preferred that filter element 18 is placed within housing 12 while potting adhesive material 50 is still at least partially uncured; that is, while the potting adhesive material is somewhat soft and flexible. When totally cured, the potting adhesive material 50 is generally hard and unbending. If any portion of filtering material 21, such as filter media 22 or inner liner 20, is misaligned in any way, it may be very difficult to place a misaligned filter element into housing 12; thus, the present invention prefers that the filter element 18 is positioned within housing 12 while the filter element 18 is conducive to alignment variations.

One Example Construction

An extension of pleated paper filter media 22 extends between first and second end caps 24, 26. Generally, the extension of filter media 22 has a length of at least 4 inches. Often, the length of filter media 22 is no greater than about 24 inches. Typically, the length of filter media 22 is about 6 to 10 inches; a preferred length is about 8 inches. The pleats of filter media 22 typically have a depth of at least about 0.5 inch. Often, the pleat depth is no greater than about 1.5 inches. A typical pleat depth is about 0.5 to 1 inch, with an example of a preferred pleat depth of about 0.76 inch.

A steel perforated inner liner 20 is positioned internal to filter media 22. Inner liner 20 has a diameter of at least about 1 inch, typically no greater than about 4 inches. Typically, inner liner has a diameter of about 1.5 to 2 inches; a preferred diameter is about 1.77 inches.

First end cap 24, made from a 0.5 mm thick tin plated steel sheet, has an outer perimeter 27 having a diameter of at least about 3 inches, no greater than about 6 inches. Typically, the outer perimeter is about 3–4 inches; a preferred outer perimeter diameter is about 3.375 inches. Outer first wall 44 typically has a height of at least about 0.25 inch, no greater than about 2 inches, and is preferably about 0.25 to 1 inch. A preferred height of first wall 44 is about 0.375 inch. Transverse second wall 46 has a length corresponding to at least the sum of the thickness of filter media 22 and thickness of any inner liner 20; typically the length of transverse second wall 46 is greater than the sum of the thickness of filter med media 22 and any inner liner 20 to allow for some clearance between elements. A typical length for transverse second wall 46 is at least 0.5 inch. Often, the length is no greater than about 1.75 inches. A typical length for transverse second wall 46 is about 0.5 to 1 inch. A particular example of a length for wall 46 is about 0.875 inch.

When first end cap 24 is seated against engagement surface 37 of hub 30, an inner perimeter 29 having a diameter of at least about 1 inch, preferably a diameter no greater than about 2 inches, is provided. A typical inner perimeter diameter is about 1.25 to 1.75 inches, preferably about 1.55 inches. Hub 30 is part of a baffle plate 28.

Second end cap 26, which is a closed end cap, has similar dimensions and includes six equally spaced protrusions extending radially about 0.125 inch from the outer perimeter.

Filter media 22 and inner liner 20 are potted in first and second end caps 24, 26 with urethane adhesive to a depth no greater than the height of first wall 44. Typically, the depth of potting adhesive material 50 is about 0.25 inch. The adhesive material retains the filter media 22 and inner liner 20 within first and second end caps 24, 26 and adheres first end cap 24 to hub 30.

The overall length of filter element 18, from the top of baffle plate 28 to second end cap 26 is at least about 5 inches. Often, the length is no greater than about 25 inches. Typically, the length of filter element 18 is about 7 to 11 inches; a preferred length is about 9 inches. The filter element 18, is placed within a housing 12 shaped and sized to accept filter element 18 therein.

Method of Operation and Servicing

As described above, the filter assembly 10, which includes the assembled filter element 18 in housing 12, is placed in a filtering system 110 such as shown in FIG. 1. Filter assembly 10 is attached to filter block or bead 120, typically by screwing filter assembly 10 onto filter head 120 by internal threads 40 on hub 30. Filtering system 110 includes a supply 112 for supplying dirty fluid to filter assembly 10 through inlet 122 of filter head 120. The fluid enters and is filtered by the filter element 18. The clean fluid exits filter head 120 at outlet 124 and is carried away by pipe 114.

When the filter element 18, in particular the filter media 22, is dirty with particulate and other contaminants and matter collected from the filtered fluid, filter assembly 10 is unscrewed from filter head 120, and a second, new filter assembly is positioned on filter head 120.

The above represents principles of the invention. Many embodiments can be made according to these principles.

What is claimed:

1. A filter arrangement comprising:
   (a) a first open end cap having an interior surface, an exterior surface, a closed outer perimeter, an open inner perimeter, and a transverse wall extending therebetween;
   (b) an extension of filtering material potted in said first open end cap at said interior surface by an adhesive material; said extension of filter material defining an internal volume; said exterior surface of said first end cap facing in a direction away from said filtering material; and
   (c) a baffle plate adjacent said exterior surface of said first end cap, said baffle plate including a hub, said hub having an aperture extending into and in open communication with said internal volume, said hub extending through an opening of said first end cap and contacting said adhesive material, said adhesive material being within said first open end cap and adhering said interior surface of said first open end cap to said hub.

2. The filter arrangement according to claim 1, further comprising:
   (a) a second closed end cap, said extension of filter material potted in said second closed end cap, and said extension extending between said first open end cap and said second closed end cap.

3. The filter arrangement according to claim 2, wherein:
   (a) said first open end cap, said second end cap, said extension of filtering material, and said baffle plate comprise a filter element.

4. The filter arrange according to claim 3 further comprising:
   (a) a filter housing constructed and arranged for receiving said filter element.

5. The filter arrangement according to claim 4, wherein said filter element is cylindrical and said filter housing is cylindrical.

6. The filter arrangement according to claim 1, wherein:
   (a) said extension of filtering material includes a pleated filter media.

7. The filter arrangement according to claim 1, wherein:
   (a) said adhesive material comprises a material selected from the group of thermoplastic adhesive material, thermoset adhesive material, and mixtures thereof.

8. The filter arrangement according to claim 7, wherein:
   (a) said adhesive material comprises a material selected from the group of urethanes, phenolics, epoxies, and mixtures thereof.

9. The filter arrangement according to claim 8, wherein said adhesive material comprises urethane.

10. The filter arrangement according to claim 1, wherein said hub is of unitary construction with said baffle plate.

11. The filter arrangement according to claim 1, wherein:
    (a) said hub further comprises a circumferential shoulder disposed on said hub for receiving said transverse wall of said first open end cap.

12. The filter arrangement according to claim 1, wherein said first open end cap is constructed of a material selected from the group consisting of metal, plastic, and paper.

13. The filter arrangement according to claim 12, wherein said first open end cap is constructed of metal.

14. The filter arrangement according to claim 13, wherein said metal is steel.

* * * * *